United States Patent
Dong et al.

(10) Patent No.: US 10,140,041 B1
(45) Date of Patent: Nov. 27, 2018

(54) MAPPED RAID (REDUNDANT ARRAY OF INDEPENDENT DISKS) IN A DATA STORAGE SYSTEM WITH RAID EXTENT SUB-GROUPS THAT ARE USED TO PERFORM DRIVE EXTENT ALLOCATION AND DATA STRIPING FOR SEQUENTIAL DATA ACCESSES TO A STORAGE OBJECT

(71) Applicant: EMC IP Holding Company LLC, Hopkinton, MA (US)

(72) Inventors: Jibing Dong, Beijing (CN); Geng Han, Beijing (CN); Michael Wahl, Bulverde, TX (US); Jian Gao, Beijing (CN); Jamin Kang, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/662,731

(22) Filed: Jul. 28, 2017

(51) Int. Cl.
G06F 12/12 (2016.01)
G06F 3/06 (2006.01)
G06F 11/10 (2006.01)

(52) U.S. Cl.
CPC .......... *G06F 3/0619* (2013.01); *G06F 3/0665* (2013.01); *G06F 3/0689* (2013.01); *G06F 11/1076* (2013.01)

(58) Field of Classification Search
CPC ..... G06F 3/0619; G06F 3/0689; G06F 3/0665
USPC ........................................................ 711/114
See application file for complete search history.

(56) References Cited

U.S. PATENT DOCUMENTS

| | | |
|---|---|---|
| 5,579,475 A | 11/1996 | Blaum et al. |
| 6,567,889 B1 | 5/2003 | DeKoning et al. |
| 6,857,059 B2 | 2/2005 | Karpoff et al. |
| 7,409,625 B2 | 8/2008 | Corbett et al. |
| 8,316,288 B2 | 11/2012 | Nowoczynski et al. |
| 8,463,992 B2 | 6/2013 | Kelton et al. |
| 2004/0260967 A1 | 12/2004 | Guha et al. |
| 2006/0075283 A1 | 4/2006 | Hartung et al. |

(Continued)

OTHER PUBLICATIONS

Blaum, et al., "Evenodd: An Optical Scheme for Tolerating Double Disk Failures in RAID Architectures", RAID Architectures: IBM Research Report, RJ 9506, Sep. 1993, pp. 245-254.

(Continued)

*Primary Examiner* — Jae U Yu
(74) *Attorney, Agent, or Firm* — BainwoodHuang

(57) ABSTRACT

Technology is provided within a mapped RAID system that creates multiple RAID extent sub-groups in a RAID mapping table. Each of the RAID extent sub-groups contains a unique set of consecutively located RAID extents within the RAID mapping table, and a unique corresponding set of drive extents is allocated to the RAID extents contained in each one of the RAID extent sub-groups. Drive extents are allocated to each RAID extent sub-group such that no drive extent is allocated to any RAID extent contained in the RAID extent sub-group that is located on the same hard disk drive as any other drive extent allocated to any other RAID extent contained in that RAID extent sub-group. Data striping may be performed based on the RAID extent sub-groups, such that host data is divided into data elements that are striped across the RAID extents contained in one or more individual RAID extent sub-groups.

13 Claims, 10 Drawing Sheets

(56) References Cited

U.S. PATENT DOCUMENTS

2008/0168224 A1* 7/2008 Davison .............. G06F 11/2058
711/114
2008/0256427 A1 10/2008 He et al.
2011/0145535 A1 6/2011 Kusama et al.
2012/0137065 A1 5/2012 Odenwald et al.

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

"Logical Block Addressing", DEW Associates Corporation, 1995-2002; <<http://www.dewassoc.com/kbase/hard_drives/lba_htm>>article was accessed on Sep. 6, 2017, 2 pages.

* cited by examiner

NEIGHBORHOOD MATRIX
700 ("NM") FOR GROUP OF HARD DISK DRIVES

|   | 0 | 1 | 2 | 3 |
|---|---|---|---|---|
| 0 | NM(0,0) | NM(1,0) | NM(2,0) | NM(3,0) |
| 1 | NM(0,1) | NM(1,1) | NM(2,1) | NM(3,1) |
| 2 | NM(0,2) | NM(1,2) | NM(2,2) | NM(3,2) |
| 3 | NM(0,3) | NM(1,3) | NM(2,3) | NM(3,3) |

MAPPED RAID (REDUNDANT ARRAY OF INDEPENDENT DISKS) IN A DATA STORAGE SYSTEM WITH RAID EXTENT SUB-GROUPS THAT ARE USED TO PERFORM DRIVE EXTENT ALLOCATION AND DATA STRIPING FOR SEQUENTIAL DATA ACCESSES TO A STORAGE OBJECT

TECHNICAL FIELD

The present disclosure relates generally to intelligent data storage systems that provide RAID (Redundant Array of Independent Disks) technology, and more specifically to technology for providing mapped RAID in a data storage system, with a RAID mapping table that is organized into RAID extent sub-groups that are used to perform drive extent allocation and data striping for improved performance when processing sequential data accesses to a storage object.

BACKGROUND

Data storage systems are arrangements of hardware and software that typically include multiple storage processors coupled to arrays of non-volatile data storage devices, such as magnetic disk drives ("hard disk drives"). The storage processors service host I/O operations received from host machines. The received I/O operations specify one or more storage objects (e.g. logical disks or "LUNs") that are to be written, read, created, or deleted. The storage processors run software that manages incoming I/O operations and performs various data processing tasks to organize and secure the host data that is received from the host machines and then stored on the non-volatile data storage devices.

Some existing data storage systems have provided traditional RAID (Redundant Array of Independent Disks) technology. As it is generally known, traditional RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks of an address space of a logical storage object), and then storing data written to consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

SUMMARY

Data storage systems providing traditional RAID (Redundant Array of Independent Disks) data protection have exhibited significant limitations with regard to the ability to add new disks, and with regard to the amount of time required to rebuild data onto a replacement disk in the event of a disk failure. Specifically, traditional RAID systems have not supported the addition of new disks on an individual disk basis, but have instead required that new storage capacity be added only in increments equal to the number of disks that is required to support the specific RAID configuration, i.e. equal to the width of the RAID stripe being used. Accordingly, for 4D+1P RAID-5 configurations, new disks could only be added to a traditional RAID system in increments of five disks at a time. For 4D+2P RAID-6 configurations, new disks could only be added to traditional RAID systems in increments of six disks. As the capacity of individual disks has increased over time with the introduction of new storage technologies, the inflexibility of traditional RAID systems with regard to adding new capacity has become increasingly burdensome and impractical.

Also as individual disk capacity has increased, the time required by traditional RAID systems to rebuild data of an entire failed disk onto a single spare disk has increased, and the write bandwidth of the single spare disk has become a significant performance bottleneck with regard to total rebuild time. Moreover, while data previously stored on the failed disk is being rebuilt on the spare disk, concurrent failure of one or more additional disks in a traditional RAID system during the rebuilding process may introduce the risk of data loss.

Mapped RAID technology improves on traditional RAID technology by allowing for the addition of individual storage drives to a data storage system in order to increase storage capacity, and also addresses the problem of increased rebuild times caused by write bandwidth bottlenecks in dedicated spare disks. In mapped RAID technology, physical data storage drives are divided into contiguous regions of non-volatile data storage referred to as "drive extents" that are allocated from a drive extent pool. A RAID mapping table organizes the allocated drive extents into "RAID extents" that indicate the allocated drive extents. Each RAID extent indicates a set of drive extents allocated from the drive extent pool, and each drive extent allocated to a given RAID extent may be located on a different physical drive. The drive extents indicated by a RAID extent are used to store the blocks of data and parity information for a stripe of data storage represented by the RAID extent. Accordingly, the number of drive extents indicated by each RAID extent may be the same as the number of disks used in a traditional RAID system to store data blocks and parity information for the same RAID level. For example, in a mapped RAID group supporting a 4D+1P RAID-5 configuration, each RAID extent indicates a total of five drive extents that are used to store the four blocks of data as well as the parity information block of the stripe represented by the RAID extent. In a 4D+2P RAID-6 configuration of mapped RAID, two parity information blocks are indicated by each RAID extent to provide an increased level of fault tolerance, and each RAID extent indicates a total of six drive extents.

In the event that a drive fails when using mapped RAID, spare drive extents can be allocated that are located on multiple physical drives contributing to the drive extent pool in order to replace the drive extents from the failed drive, thus spreading the rebuild read and write operations across multiple physical drives, and eliminating the write bandwidth bottleneck previously caused by traditional RAID's reliance on rebuilding to a single spare physical data storage drive. As the number of physical data storage drives involved in rebuilding data previously stored on a failed drive increases, the amount of concurrent processing that can be used during the rebuild process generally increases, resulting in progressively improved rebuild performance. In this way, mapped RAID can generally reduce rebuild time in the face of a single drive failure.

Significant shortcomings may arise in mapped RAID implementations when processing writes to sequential blocks of a storage object. In particular, previous mapped RAID implementations have failed to provide performance matching that of traditional RAID implementations when processing sequential write operations. For example, in some data storage systems, a cache may be used to initially store received host data that is directed to random locations within a storage object's logical block address space. Such a cache may advantageously provide rapid access to the data stored in the cache, without requiring time-consuming retrieval of the data from the non-volatile data storage devices, and host write operations may be acknowledged as completed upon secure storage of the received host write data within the cache. Data stored in the cache must eventually be flushed to the non-volatile data storage devices of the data storage system. During a cache flush operation, those portions of the cache that have been modified since a last preceding cache flush operation (the "dirty" portions of the cache) are written to specific drive extents indicated by corresponding RAID extents contained in the RAID mapping table. The blocks of data within the dirty portions of the cache may be flushed sequentially from the cache, with the flushed blocks having sequential logical block addresses, e.g. blocks having consecutive, increasing logical block addresses within the address space of the storage object. In this way, the cache converts randomly distributed write I/O operations that are received from the hosts into some number of sequential writes to a storage object that are stored in non-volatile data storage using drive extents indicated by RAID extents contained in the RAID mapping table. Unfortunately, in mapped RAID systems that randomly allocate drive extents to RAID extents without consideration of the specific devices from which the drive extents are allocated, and without consideration of the specific locations on the devices from which the drive extents are allocated, the sequential write operations to the storage object may be translated by the RAID mapping table into random accesses across the non-volatile data storage devices, resulting in performance that is less than can be achieved using traditional RAID systems, due to the high amount of seek time required by hard disk drives to access the randomly distributed locations at which the data received from the cache is to be stored.

To address these and other shortcomings of previous systems, new technology is disclosed herein for providing RAID data protection for a storage object in a data storage system, in which the data storage system includes a storage processor and a group of hard disk drives communicably coupled to the storage processor. In the disclosed technology, a RAID mapping table is generated that contains RAID extents. Each RAID extent contained in the RAID mapping table indicates a predetermined number of drive extents that are each used to persistently store host data written to a corresponding portion of the address space of the storage object. Each drive extent is a contiguous region of non-volatile data storage located on one of the hard disk drives in the group of hard disk drives. Multiple RAID extent sub-groups are created in the RAID mapping table. Each one of the RAID extent sub-groups contains a unique set of consecutively located RAID extents within the RAID mapping table. The disclosed technology allocates, to the RAID extents contained in each one of the RAID extent sub-groups, a unique corresponding set of drive extents. The corresponding sets of drive extents are allocated to the RAID extent sub-groups such that for each RAID extent sub-group, no drive extent is allocated to any RAID extent contained in the RAID extent sub-group that is located on the same hard disk drive as any other drive extent allocated to any other RAID extent contained in that RAID extent sub-group.

In some embodiments, a set of data may be received that spans a sequential range of logical block addresses within the address space of the storage object. The received data is divided into fixed size data elements. A RAID extent sub-group corresponding to the sequential range of logical block addresses within the address space of the storage object is identified within the RAID mapping table. The disclosed technology then stripes the data elements across the RAID extents contained in the identified RAID extent sub-group by writing consecutive ones of the data elements to sets of drive extents indicated by consecutive ones of the RAID extents contained in the RAID extent sub-group corresponding to the sequential range of logical block addresses within the address space of the storage object until all the data elements generated by dividing the received data have been written.

In some embodiments, each one of the RAID extents in the RAID mapping table indicates the same predetermined total number of drive extents, and a RAID extent sub-group size may be calculated, such that the value of the RAID extent sub-group size has a value that is at least as large as the result of dividing i) a total number of hard disk drives contained in the group of hard disk drives, by ii) the predetermined total number of drive extents indicated by each one of the RAID extents in the RAID mapping table. The plurality of RAID extent sub-groups may then be created in the RAID mapping table such that each one of the RAID extent sub-groups contains a total number of consecutively located RAID extents that is equal to the RAID extent sub-group size.

In some embodiments, drive extents may be allocated to the RAID extent sub-groups at least in part by allocating consecutive, contiguous drive extents from each hard disk drive, starting from drive extents that extend over lower ranges of logical block addresses of the hard disk drive, and continuing upwards through consecutive, contiguously located drive extents that extend over higher ranges of logical block addresses of the hard disk drive.

In some embodiments, the disclosed technology allocates a unique corresponding set of drive extents to each one of the RAID extent sub-groups at least in part by generating a neighborhood matrix for the group of hard disk drives. Each matrix element in the neighborhood matrix for the group of hard disk drives corresponds to a pair of hard disk drives contained in the group of hard disk drives and stores a value equal to a total number of RAID extents in the RAID mapping table that indicate both i) at least one hard disk drive extent located on a first one of the hard disk drives in the pair of hard disk drives corresponding to the matrix element, and ii) at least one drive extent located on a second one of the hard disk drives in the pair of drives corresponding to the matrix element. The disclosed technology may allocate each drive extent contained in the unique corresponding set of drive extents at least in part by i) generating a list of candidate drives contained in the group of hard disk drives, wherein each one of the candidate drives has located thereon at least one free drive extent and has no drive extent located thereon that was previously allocated to any RAID extent in the RAID extent sub-group, ii) assigning, to each one of the candidate drives, a variance weighting that is equal to a variance of the values of the matrix elements in the neighborhood matrix for the group of hard disk drives resulting from modifying the neighborhood matrix to indicate that the drive extent was allocated from the candidate drive, iii) selecting one of the candidate drives having a lowest assigned variance weighting, and iv) allocating a drive extent to the RAID extent sub-group from the candidate drive having the lowest assigned variance weighting.

In some embodiments, allocating a unique corresponding set of drive extents to each one of the RAID extent sub-groups further may include determining whether any drive extent has previously been allocated to the RAID extent sub-group. In response to determining that no drive extent has previously been allocated to the RAID extent sub-group, the disclosed technology may i) determine which one of the hard disk drives in the group of hard disk drives that has located thereon a number of free drive extents that is greater than the number of free drive extents located on any other hard disk drive in the group of hard disk drives, and ii) allocate a drive extent to the RAID extent sub-group from the one of the hard disk drives that has located thereon the number of free drive extents that is greater than the number of free drive extents located on any other hard disk drive in the group of hard disk drives.

In some embodiments, a flush operation may be performed on a cache that is located within the data storage system that stores host data received by the data storage system that is directed to the storage object. The set of data to be written to the storage object that is directed to the sequential range of logical block addresses of the storage object may be an output received from the cache during the flush operation.

Embodiments of the disclosed technology may provide significant advantages over previous technical solutions. By allocating drive extents from different hard disk drives to the RAID extents that are contained within each individual RAID extent sub-group, embodiments of the disclosed technology may increase the amount of concurrent processing that can be performed when write operations are striped across the RAID extents in each RAID extent sub-group. By allocating consecutively located, contiguous drive extents from within individual hard disk drives, embodiments of the disclosed technology may avoid the performance degradation that would otherwise result when processing sequential write operations using discontiguous drive extents. By allocating drive extents from candidate hard disk drives that are selected such that a minimum variance of the values in the neighborhood matrix for the group of hard disk drives is maintained, embodiments of the disclosed system may evenly distribute the RAID extents in the RAID mapping table across the hard disk drives in the group of hard disk drives, thus avoiding potential bottlenecks and increasing concurrency during the process of rebuilding data from a failed one of the hard disk drives in the group of hard disk drives.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described herein are provided only as examples, in order to illustrate various features and principles of the invention, and that the invention is broader than the specific embodiments described herein.

Figure 1:
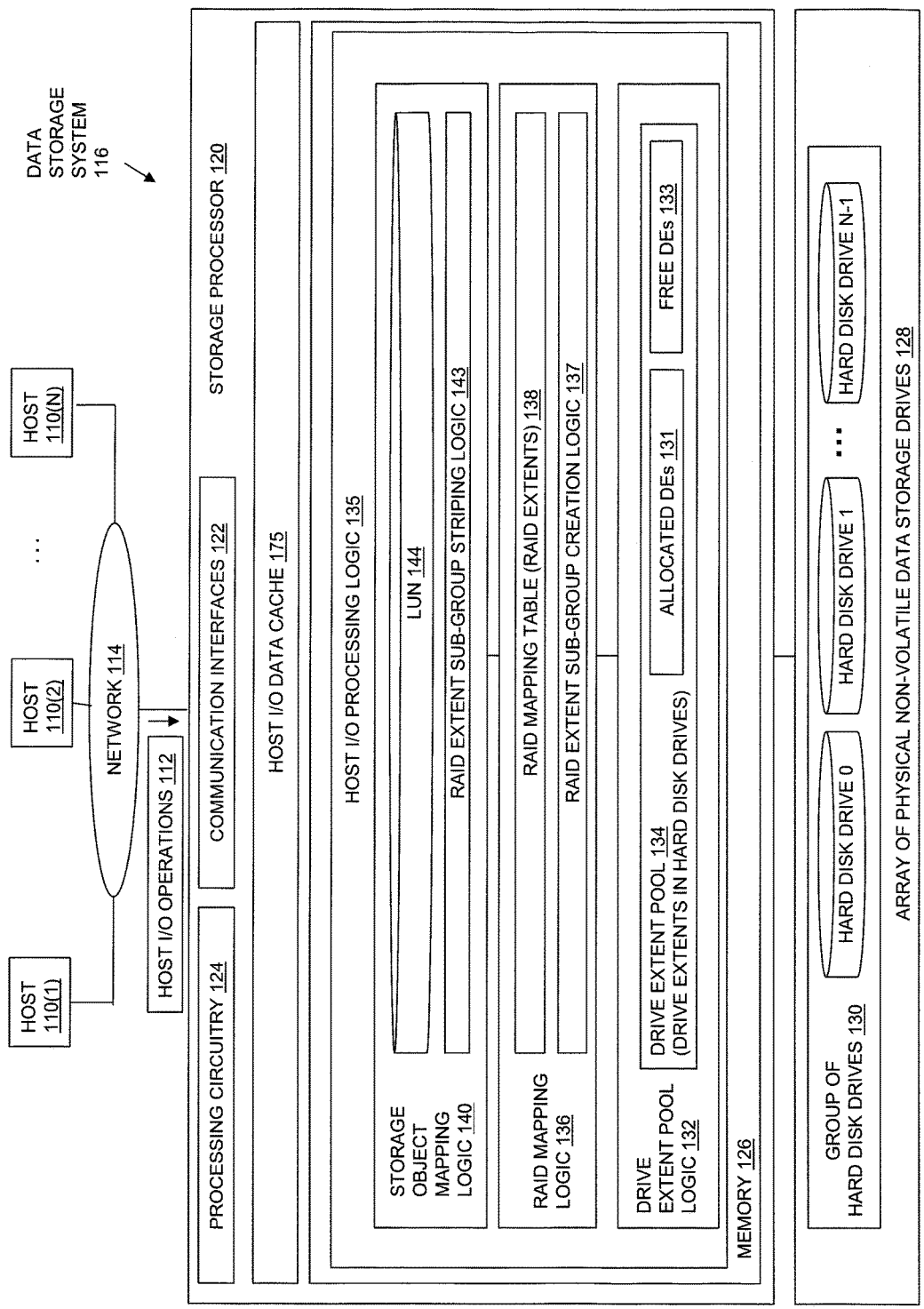
FIG. 1 is a block diagram showing an operational environment for some embodiments of the disclosed technology, including an example of a data storage system in which the disclosed technology may be embodied, with an example of a storage object, a RAID mapping table, a drive extent pool, and an underlying group of hard disk drives.

FIG. 1 is a block diagram showing an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Physical Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Physical Non-Volatile Data Storage Drives 128 may include hard disk drives such as magnetic disk drives. Array of Physical Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by dividing each one of the hard disk drives in the Group of Hard Disk Drives 130 into multiple, equal size drive extents, each of which consists of a physically contiguous range of non-volatile data storage located on a single drive. For example, Drive Extent Pool Logic 132 may divide each one of the hard disk drives in the Group of Hard Disk Drives 130 into a fixed number of equal size drive extents of physically contiguous non-volatile storage, and add indications of each one of the resulting drive extents to Drive Extent Pool 134. The drive extents indicated by Drive Extent Pool 134 may each either be i) one of Allocated Drive Extents 131 that have been allocated to a RAID extent in the RAID Mapping Table 138, or ii) one of Free Drive Extents 133 that are unallocated "spare" drive extents and available for future allocation to RAID extents in RAID Mapping Table 138, e.g. to individual RAID extents in the RAID Mapping Table 138 to which a complete set of drive extents has not yet been allocated, and/or in response to a failure condition, to replace, within RAID extents in the RAID Mapping Table 138, drive extents located on a failed drive in the Group of Hard Disk Drives 130.

The Group of Hard Disk Drives 130 from which Drive Extent Pool 134 is generated may consist of all the physical data storage drives in Array of Physical Non-Volatile Data Storage Drives 128, or only a subset of the physical data storage drives in Array of Physical Non-Volatile Data Storage Drives 128. Accordingly, the disclosed techniques may be embodied such that Array of Physical Non-Volatile Data Storage Drives 128 includes multiple separate groups of hard disk drives, each one of which may be used to independently generate a separate pool of drive extents.

The size of the drive extents into which the hard disk drives in the Group of Hard Disk Drives 130 are divided is the same for every hard disk drive in the Group of Hard Disk Drives 130. Various specific sizes of drive extents may be used in different embodiments. For example, in some embodiments each drive extent may have a size of 10 gigabytes. Larger or smaller drive extent sizes may be used in the alternative. Any specific number of physical data storage drives may be contained in the Group of Hard Disk Drives 130 and divided into equal size drive extents to generate Drive Extent Pool 134. The physical data storage drives in the Group of Hard Disk Drives 130 may each have the same total capacity, and may accordingly each be divided into the same number of drive extents. Alternatively, the hard disk drives in Group of Hard Disk Drives 130 may have a variety of different capacities, resulting in different physical data storage drives being divided into different numbers of equal size drive extents.

After dividing each one of the hard disk drives in the Group of Hard Disk Drives 130 into multiple, equal size drive extents of physically contiguous non-volatile data storage, and adding indications of the resulting drive extents to Drive Extent Pool 134, drive extents are allocated to specific RAID extents contained in RAID Mapping Table 138, to be used to store host data directed to the RAID extents to which they are allocated. For example, individual drive extents may be allocated from Drive Extent Pool 134 to a specific individual RAID extent that is contained in RAID Mapping Table 138 in response to one or more allocation requests from RAID Mapping Logic 136, and then used to store host data that is directed to LUN 144 and mapped to that specific RAID extent. In some embodiments, drive extents are allocated to RAID extents in the RAID Mapping Table 138, such that no two drive extents indicated by any single RAID extent are located on the same hard disk drive.

In some embodiments, RAID Extent Sub-Group Creation Logic 137 creates multiple RAID extent sub-groups in RAID Mapping Table 138. Each one of the RAID extent sub-groups created by RAID Extent Sub-Group Creation Logic 137 contains a unique set of consecutive RAID extents within RAID Mapping Table 138. Based on the RAID extent sub-groups created by RAID Extent Sub-Group Creation Logic 137, RAID Mapping Logic 136 allocates, from Drive Extent Pool 134, a unique corresponding set of drive extents to the RAID extents that are contained in each one of the RAID extent sub-group that were created in the RAID Mapping Table 138. Each set of drive extents allocated to the RAID extents contained in a RAID extent sub-group is allocated such that no drive extent is allocated to any RAID extent contained in the RAID extent sub-group that is located on the same hard disk drive as any other drive extent allocated to any other RAID extent contained in the same RAID extent sub-group. In this way, RAID Mapping Logic 136 ensures that each drive extent allocated to any one of the RAID extents in a RAID extent sub-group is allocated from a different hard disk drive than is used to allocate any other drive extent that is allocated to any of the RAID extents contained in the same RAID extent sub-group.

When a drive extent is allocated to a RAID extent, an indication of the drive extent is stored in the RAID extent. For example, a drive extent allocated to a RAID extent may be indicated within that RAID extent using a pair of indexes "m|n", in which "m" indicates a drive index of the physical data storage drive on which the drive extent is located (e.g. a numeric drive number within Array of Physical Non-Volatile Data Storage Drives 128, a slot number within which the physical drive located, or a textual drive name, etc.), and "n" indicates an index of the drive extent within the physical data storage drive (e.g. a numeric drive extent number, a logical block number or offset, a sector number, etc.). For example, in embodiments in which physical data storage drives are indexed within Array of Physical Non-Volatile Data Storage Drives 128 starting with a logical block address of 0, and in which drive extents are indexed within the hard disk drive that contains them starting with drive extent number of 0, a first drive extent of a first hard disk drive within Array of Physical Non-Volatile Data Storage Drives 128 may be represented by "0|0", a second drive extent within the first hard disk drive within Array of Physical Non-Volatile Data Storage Drives 128 may be represented by "0|1", and so on.

Each RAID extent in the RAID Mapping Table 138 indicates the same predetermined total number of drive extents. For example, in some embodiments configured to provide 4D+1P RAID-5 protection for LUN 144, each RAID extent in the RAID Mapping Table 138 may represent a single data stripe by indicating five drive extents, where each of the five drive extents is located on a different hard disk drive, and where four of the drive extents are used to store host data written to LUN 144 and one of the drive extents is used to store parity information. In order to provide drive diversity with regard to spare drive extents, the minimum number of physical drives (e.g. in Group of Hard Disk Drives 130), that is required to provide 4D+1P RAID-5 protection for LUN 144 must be greater than five, i.e. six or more. In another example, in some embodiments that are configured to provide 4D+2P RAID-6 protection for LUN 144, each RAID extent in the RAID Mapping Table 138 may represent a single data stripe by indicating six drive extents, where each of the six drive extents is located on a different hard disk drive, and where four of the drive extents are used to store host data written to LUN 144 and two of the drive extents are used to store parity information. In order to provide drive diversity with regard to providing spare drive extents, the minimum number of hard disk drives (e.g. in Group of Hard Disk Drives 130), that is required to provide 4D+2P RAID-6 protection for LUN 144 must be greater than six, i.e. seven or more. In either of these examples, the minimum number of physical drives required to provide RAID data protection for LUN 144 may be greater than the number of drive extents indicated by each RAID extent in the RAID Mapping Table 138.

A drive extent may be released (i.e. deallocated) from a specific RAID extent back to Drive Extent Pool 134, and thereby made available for re-allocation to a different RAID extent, in response to a deallocation request or the like from RAID Mapping Logic 136, e.g. when the drive extent is no longer needed to store host data.

Host I/O Processing Logic 135 exposes one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 directs host data written to sets of consecutive blocks in a logical address space of LUN 144 to specific corresponding RAID extents in RAID Mapping Table 138, so that, for example, the host data written to a set of consecutive blocks in the logical address space of the LUN 144 can be persistently stored by drive extents indicated by a corresponding RAID extent in the RAID Mapping Table 138, and so that parity information can be calculated and stored in at least one of the drive extents of the corresponding RAID extent to support data recovery. For example, an address space of LUN 144 may be made up of a set of sequential, equal size blocks associated with logical block numbers (also known as logical block addresses) within the address space. Each host write I/O operation may indicate a specific range of blocks to be written within the logical block address space of the LUN 144, e.g. using a logical block number (e.g. a logical block address) or offset into LUN 144, and a length. In some embodiments, 4D+1P RAID-5 striping with distributed parity error protection may be performed within each RAID extent, with each RAID stripe consisting of four data blocks and a block of parity information, and each RAID stripe being represented by a single RAID extent and mapped to the drive extents indicated by that RAID extent. In such embodiments, each RAID extent may indicate five drive extents. For each set of four consecutive blocks in the logical address space of LUN 144 that are mapped to a single RAID extent, host data may be striped across the drive extents indicated by that RAID extent by storing equal sized portions of the host data into different ones of the four drive extents indicated by that RAID extent that are used to store host data. In some embodiments, for example, the portions of the host data that are striped across the drive extents that store data in each individual RAID extent may have a size of 64 KB (64 kilobytes). Parity information may be calculated and stored in another drive extent that is indicated by the RAID extent, e.g. as an XOR of the host data stored in the drive extents indicated by the RAID extent that are used to store data. In this way, host data stored in any one of the drive extents indicated by the RAID extent that store host data can be recovered in the event of a failure of a physical data storage drive containing one of the drive extents indicated by the RAID extent that store host data, for example by performing one or more XOR operations on the data stored in the surviving drive extents indicated by the RAID extent that store host data, in combination with the parity information stored in the other drive extent indicated by the RAID extent.

In some embodiments, Storage Processor 120 includes a persistent mirrored cache, shown for purposes of illustration in FIG. 1 by Host I/O Data Cache 175. For example, Host I/O Data Cache 175 may be implemented in DRAM (Dynamic Random Access Memory). The DRAM may be mirrored to DRAM on at least one additional storage processor other than Storage Processor 120 (not shown), and that is also contained within Data Storage System 116. The DRAM on both storage processors may be backed up by battery. The contents of the Host I/O Data Cache 175 may thus persist on at least two storage processors, even in the event of a power loss.

Host I/O Operations 112 include or indicate host data that is to be written to LUN 144. Such host data may initially be stored in Host I/O Data Cache 175. Storage Processor 120 may provide an acknowledgment to each host that issues a write I/O operation once the host data included in or indicated by the operation has been securely stored in Host I/O Data Cache 175, thus indicating to the host that the write operation has been successfully completed. In this way, over time, Host I/O Data Cache 175 accumulates host data that is written to random locations (e.g. random logical block addresses) within the logical address space of LUN 144.

The host data accumulated in Host I/O Data Cache 175 is flushed from Host I/O Data Cache 175, to be stored into the non-volatile data storage provided by the Group of Hard Disk Drives 130, based on the mapping of logical block addresses in LUN 144 to specific drive extents in the Group of Hard Disk Drives 130 provided by RAID Mapping Table 138. For example, in response to a cache flush operation on Host I/O Data Cache 175, those portions of Host I/O Data Cache 175 that have been modified since the last preceding cache flush operation (the "dirty" portions of the Host I/O Data Cache 175) are written to specific drive extents indicated by RAID extents in the RAID Mapping Table 138 that correspond to the portions of the address space of LUN 144 to which the host data stored in Host I/O Data Cache 175 was written. The blocks of host data within the dirty portions of the Host I/O Data Cache 175 are output from Host I/O Data Cache 175 sequentially in order of ascending logical block address (e.g. logical block number) within the logical address space of LUN 144. In this way, the Host I/O Data Cache 175 collects host write data received from the Hosts 110 that is randomly distributed across the logical address space of LUN 144 and converts the randomly distributed host write data into some number of sets of sequential host data, each one of which spans a sequential range of logical block addresses within the LUN 144. The sets of host data that span sequential ranges of logical block addresses within the logical address space of LUN 144 may be passed from Host I/O Data Cache 175 to Storage Object Mapping Logic 140 during a flush operation performed by Host I/O Data Cache 175.

In some embodiments, when Storage Object Mapping Logic 140 receives a set of sequential host data from Host I/O Data Cache 175 that spans a sequential range of logical block addresses within the logical address space of LUN 144, RAID Extent Sub-Group Striping Logic 143 divides the received set of sequential host data into multiple fixed size data elements to be striped across the RAID extents of one or more identified RAID extent sub-groups. The size of the data elements into which the set of sequential host data is divided by RAID Extent Sub-Group Striping Logic 143 may, for example, be equal to a configuration value that is associated with LUN 144. In some embodiments, the data element size is automatically selected from within a valid range of data element sizes. The valid range may include possible values for the data element size that are less than an upper limit that is equal a product of i) the size of each individual drive extent and ii) the number of drive extents that are used to store data in each RAID extent (e.g. 4 in the case of a 4D+1P RAID 5 configuration). In some embodiments the valid range may include possible values that are greater than a product of i) the size of the data units that may be used for RAID block level striping that may also be performed within each RAID extent (e.g. 64 KB) and ii) the number of drive extents that are used to store data in each RAID extent. In some embodiments, the possible values from which the data element size may be automatically selected may include only values that, when divided by the number of drive extents used to store data in each RAID extent, result in a divisor of the size of each individual drive extent. In other words, the data element size may be selected such that the size of the individual drive extents is a multiple of the result of dividing the selected data element size by the number of drive extents used to store data in each RAID extent.

After the RAID Extent Sub-Group Striping Logic 143 divides the received set of host data into multiple fixed size data elements, at least one RAID extent sub-group within RAID Mapping Table 138 is identified that corresponds to the sequential range of logical block addresses within the logical address space of LUN 144, e.g. by RAID Mapping Logic 136 and/or Storage Object Mapping Logic 140. The data elements are then striped across the RAID extents that are contained in the identified RAID extent sub-group by writing consecutive ones of the data elements to sets of drive extents indicated by consecutive ones of the RAID extents contained in the RAID extent sub-group(s) corresponding to the sequential range of logical block addresses within the logical address space of LUN 144 until all of the data elements have been written. In an example in which each RAID extent sub-group contains two RAID extents, the first one of the data elements is written to the drive extents that store data that are indicated by the first one of the RAID extents contained in the RAID extent sub-group corresponding to the sequential range of logical block addresses within the logical address space of LUN 144, the second one of the data elements is written to the drive extents that store data that are indicated by a second one of the RAID extents contained in the RAID extent sub-group corresponding to the sequential range of logical block addresses within the logical address space of LUN 144, the third one of the data elements is written to the drive extents that store data that are indicated by the first one of the RAID extents contained in the RAID extent sub-group corresponding to the sequential range of logical block addresses within the logical address space of LUN 144, the fourth one of the data elements is written to the drive extents that store data that are indicated by the second one of the RAID extents contained in the RAID extent sub-group corresponding to the sequential range of logical block addresses within the logical address space of LUN 144, and so on, looping through the RAID extents contained in the RAID extent sub-group until all of the data elements have been written. In the case where the data elements cannot all be stored using the drive extents indicated by the RAID extents contained in a single RAID extent sub-group, after the capacity of one RAID extent sub-group has been consumed, the RAID extents in one or more subsequently located RAID extent sub-groups in the RAID Mapping Table 138 may be similarly used to store the additional data elements until all the data elements have been written.

In some embodiments, RAID Extent Sub-Group Creation Logic 137 may calculate a RAID extent sub-group size. The value of the RAID extent sub-group size may be at least as large as the result of dividing i) a total number of hard disk drives that are contained in the group of hard disk drives, by ii) the predetermined total number of drive extents indicated by each one of the RAID extents in the RAID mapping table. RAID Extent Sub-Group Creation Logic 137 may create the RAID extent sub-groups in RAID Mapping Table 138 such that each one of the RAID extent sub-groups contains a total number of consecutively located RAID extents that is equal to the RAID extent sub-group size.

In some embodiments, RAID Mapping Logic 136 allocates drive extents to the RAID extent sub-groups at least in part by allocating consecutive, contiguous drive extents from each hard disk drive in the Group of Hard Disk Drives 130, starting from drive extents that extend over lower ranges of logical block addresses of the hard disk drive, and continuing upwards through consecutive, contiguously located drive extents that extend over higher ranges of logical block addresses of the hard disk drive. In other words, whenever a drive extent is allocated from one of the hard disk drives in the Group of Hard Disk Drives 130, the drive extent that is allocated is located contiguous to and immediately after the last drive extent that was allocated from the same hard disk drive, within the logical block address space of the hard disk drive.

In some embodiments, RAID Mapping Logic 136 allocates a unique corresponding set of drive extents to each one of the RAID extent sub-groups at least in part by generating a neighborhood matrix for the Group of Hard Disk Drives 130. Each matrix element in the neighborhood matrix for the Group of Hard Disk Drives 130 corresponds to a pair of hard disk drives contained in the group of hard disk drives and stores a value equal to a total number of RAID extents in the RAID mapping table that indicate both i) at least one drive extent that is located on a first one of the hard disk drives in the pair of hard disk drives corresponding to the matrix element, and ii) at least one drive extent that is located on a second one of the hard disk drives in the pair of hard disk drives corresponding to the matrix element. RAID Mapping Logic 136 then uses the neighborhood matrix to allocate each drive extent contained in the unique corresponding set of drive extents for a RAID extent sub-group at least in part by i) generating a list of candidate drives contained in the group of hard disk drives, such that each one of the candidate drives in the list has located thereon at least one free drive extent and has no drive extent located thereon that was previously allocated to any RAID extent in the RAID extent sub-group, ii) assigning, to each one of the candidate drives in the list, a variance weighting that is equal to a variance of the values of the elements in the neighborhood matrix for the group of hard disk drives that would result from modifying the neighborhood matrix to indicate that the drive extent was allocated from the candidate drive, iii) selecting the candidate drive in the list that has a lowest assigned variance weighting of all candidate drives in the list, and iv) allocating a drive extent to the RAID extent sub-group from the selected candidate drive.

In some embodiments, RAID Mapping Logic 136 allocates a unique corresponding set of drive extents to each one of the RAID extent sub-groups at least in part by determining whether any drive extent has previously been allocated to any RAID extent in the RAID extent sub-group, and in response to determining that no drive extent has previously been allocated to any RAID extent in the RAID extent sub-group: i) determining which one of the hard disk drives in the group of hard disk drives that has located thereon a number of free drive extents that is greater than the number of free drive extents located on any other hard disk drive in the group of hard disk drives, and ii) allocating a drive extent to a RAID extent contained in the RAID extent sub-group from the one of the hard disk drives that has located thereon the number of free drive extents that is greater than the number of free drive extents located on any other hard disk drive in the group of hard disk drives.

Figure 2:
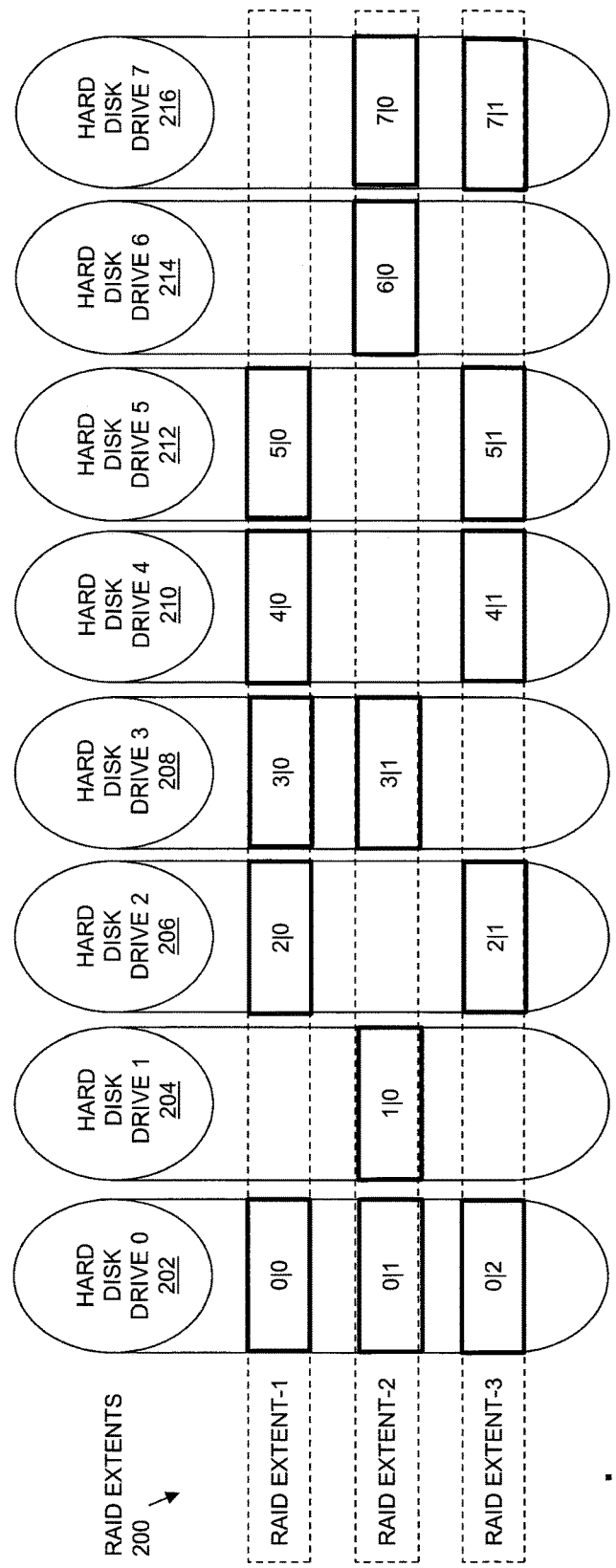
FIG. 2 is a block diagram showing an example of RAID extents in a RAID mapping table indicating drive extents that are located on hard disk drives contained in a group of hard disk drives in some embodiments.

FIG. 2 is a block diagram showing an illustrative example of RAID Extents 200, as may be contained in the RAID Mapping Table 138 in embodiments that provide 4D+1P RAID-5 striping and data protection. As shown in the example of FIG. 2, RAID Extents 200 include a first RAID Extent-1, a second RAID Extent-2, a third RAID Extent-3, and so on for some total number of RAID extents. In order to provide 4D+1P RAID-5, each RAID extent in RAID Extents 200 indicates a total of five drive extents.

RAID Extent-1 is shown for purposes of illustration indicating a first drive extent 0|0, which is the first drive extent in Hard Disk Drive 0 202, a second drive extent 2|0, which is the first drive extent in Hard Disk Drive 2 206, a third drive extent 3|0, which is the first drive extent in Hard Disk Drive 3 208, a fourth drive extent 4|0, which is the first drive extent in Hard Disk Drive 4 210, and a fifth drive extent 5|0, which is the first drive extent in Hard Disk Drive 5 212.

RAID Extent-2 is shown for purposes of illustration indicating a first drive extent 0|1, which is the second drive extent in Hard Disk Drive 0 202, a second drive extent 1|0, which is the first drive extent in Hard Disk Drive 1 204, a third drive extent 3|1, which is the second drive extent in Hard Disk Drive 3 208, a fourth drive extent 6|0, which is the first drive extent in Hard Disk Drive 6 214, and a fifth drive extent 7|0, which is the first drive extent in Hard Disk Drive 7 616.

RAID Extent-3 is shown for purposes of illustration indicating a first drive extent 0|2, which is the third drive extent in Hard Disk Drive 0 202, a second drive extent 2|1, which is the second drive extent in Hard Disk Drive 2 206, a third drive extent 4|1, which is the second drive extent in Hard Disk Drive 4 210, a fourth drive extent 5|1, which is the second drive extent in Hard Disk Drive 5 212, and a fifth drive extent 7|1, which is the second drive extent in Hard Disk Drive 7 216.

Figure 3:
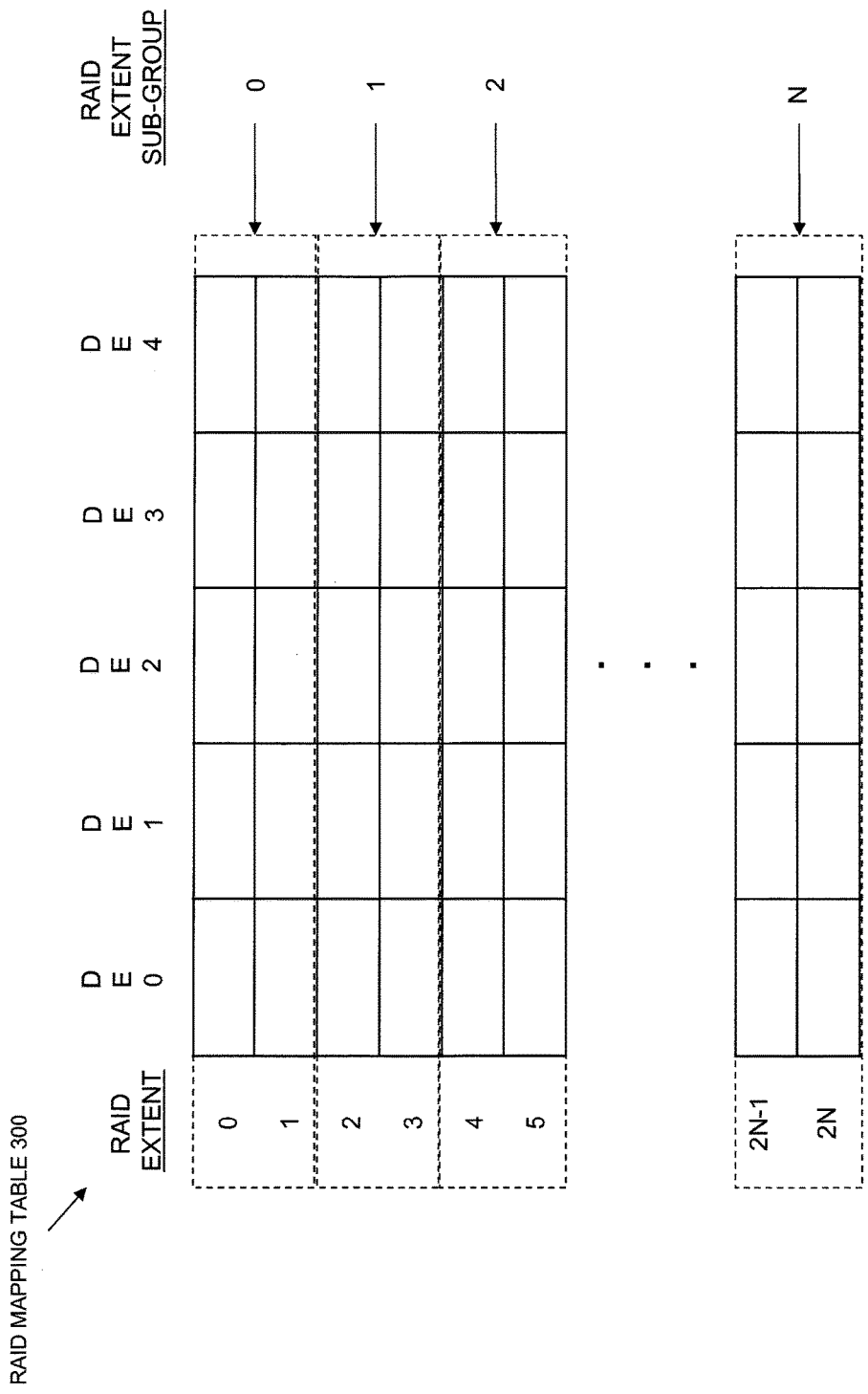
FIG. 3 is a block diagram showing an example of RAID extent sub-groups that are created within a RAID mapping table in some embodiments.

FIG. 3 is a block diagram showing an example of N RAID extent sub-groups that have been created within a RAID Mapping Table 300 using the disclosed technology. As shown in the example of FIG. 3, RAID Mapping Table 300 includes a RAID extent sub-group 0 that contains RAID extents 0 and 1, a RAID extent sub-group 1 that contains RAID extents 2 and 3, a RAID extent sub-group 2 that contains RAID extents 4 and 5, and so on through a RAID extent sub-group N that contains RAID extents 2N−1 and 2N. In the example of FIG. 3, each RAID extent sub-group contains two RAID extents. Further in the example of FIG. 3, each RAID extent indicate five drive extents, DE0, DE1, DE2, DE3, and DE4.

Figure 4:
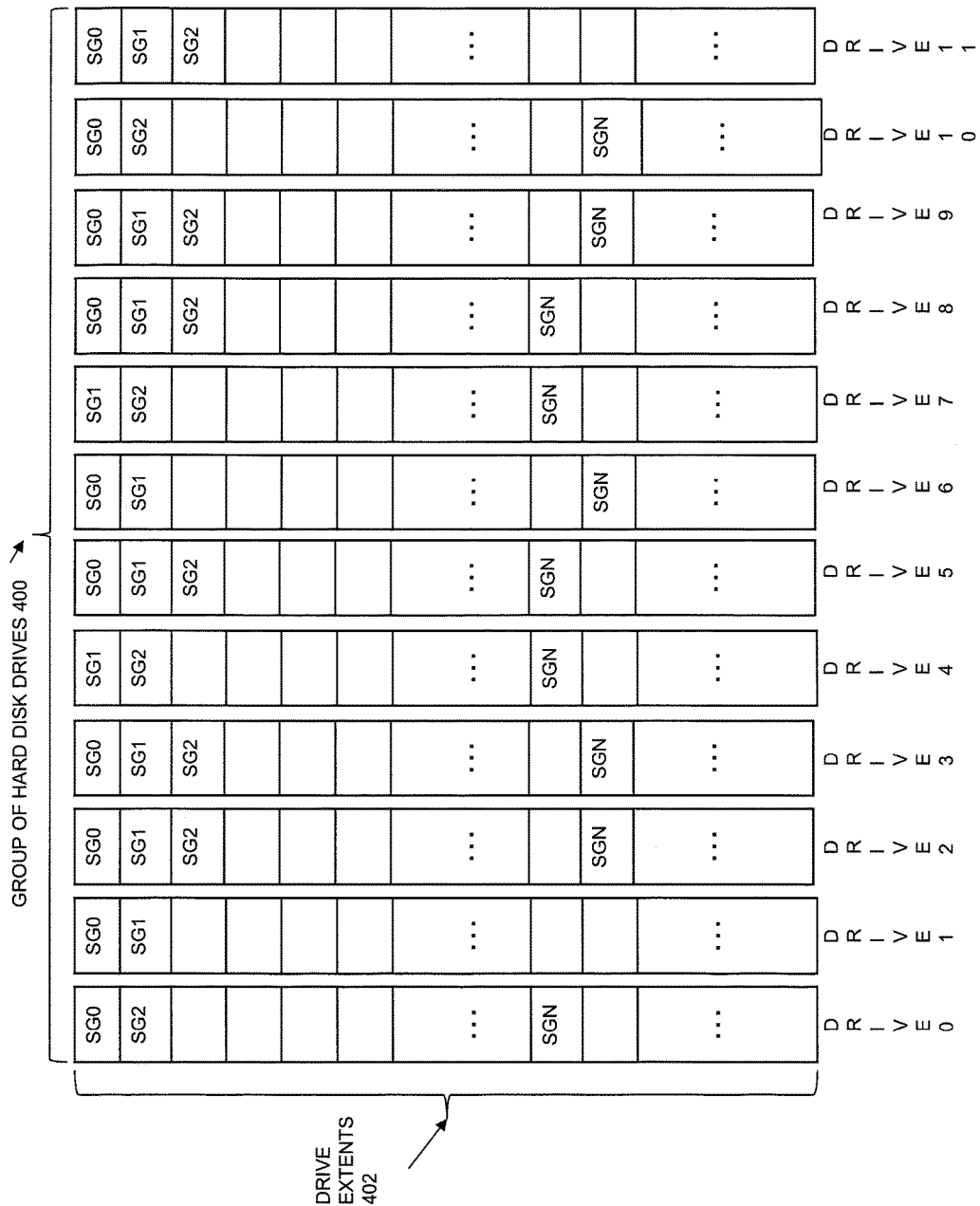
FIG. 4 is a block diagram showing an example of allocation of drive extents from a group of hard disk drives to specific RAID extent sub-groups in some embodiments.

FIG. 4 is a block diagram showing an example of the allocation of Drive Extents 402 in a Group of Hard Disk Drives 400 to the RAID extents contained in specific individual RAID extent sub-groups. In the example of FIG. 4, each drive extent allocated from one of the hard disk drives in the Group of Hard Disk Drives 400 is labeled to indicate which RAID extent sub-group the drive extent has been allocated to. Accordingly, for purposes of illustration, those drive extents that are allocated to any of the RAID extents contained in RAID extent sub-group 0 are labeled with "SG0", those drive extents that are allocated to any of the RAID extents contained in RAID extent sub-group 1 are labeled with "SG1", those drive extents allocated to any of the RAID extents contained in RAID extent sub-group 2 are labeled with "SG2", and drive extents that are allocated to any of the RAID extents contained in RAID extent sub-group N are labeled with "SGN". While drive extents are also allocated to RAID extents in RAID extent sub-groups between RAID extent sub-group 2 and RAID extent sub-group N, for purposes of clear illustration and concise explanation only those drive extents allocated to RAID extent sub-group 0, RAID extent sub-group 1, RAID extent sub-group 2, and RAID extent sub-group N are explicitly labeled in FIG. 4.

Specifically, as shown in FIG. 4, in hard disk drive 0 ("DRIVE0") the first drive extent is shown allocated to one of the RAID extents contained in RAID extent sub-group 0, the second drive extent is shown allocated to one of the RAID extents contained in RAID extent sub-group 2, and another subsequent drive extent is shown allocated to one of the RAID extents contained in RAID extent sub-group N.

In hard disk drive 1 ("DRIVE1") the first drive extent is shown allocated to one of the RAID extents contained in RAID extent sub-group 0, and the second drive extent is shown allocated to one of the RAID extents contained in RAID extent sub-group 1.

In hard disk drive 2 ("DRIVE2") the first drive extent is shown allocated to one of the RAID extents contained in RAID extent sub-group 0, the second drive extent is shown allocated to one of the RAID extents contained in RAID extent sub-group 1, the third drive extent is shown allocated to one of the RAID extents contained in RAID extent sub-group 2, and another drive extent is shown allocated to one of the RAID extents contained in RAID extent sub-group N.

In hard disk drive 3 ("DRIVE3") the first drive extent is shown allocated to one of the RAID extents contained in RAID extent sub-group 0, the second drive extent is shown allocated to one of the RAID extents contained in RAID extent sub-group 1, the third drive extent is shown allocated to one of the RAID extents contained in RAID extent sub-group 2, and another drive extent is shown allocated to one of the RAID extents contained in RAID extent sub-group N.

In hard disk drive 4 ("DRIVE4") the first drive extent is shown allocated to one of the RAID extents contained in RAID extent sub-group 1, the second drive extent is shown allocated to one of the RAID extents contained in RAID extent sub-group 2, and another drive extent is shown allocated to one of the RAID extents contained in RAID extent sub-group N.

In hard disk drive 5 ("DRIVE5") the first drive extent is shown allocated to one of the RAID extents contained in RAID extent sub-group 0, the second drive extent is shown allocated to one of the RAID extents contained in RAID extent sub-group 1, the third drive extent is shown allocated to one of the RAID extents contained in RAID extent sub-group 2, and another drive extent is shown allocated to one of the RAID extents contained in RAID extent sub-group N.

In hard disk drive 6 ("DRIVE6") the first drive extent is shown allocated to one of the RAID extents contained in RAID extent sub-group 0, the second drive extent is shown allocated to one of the RAID extents contained in RAID extent sub-group 1, and another drive extent is shown allocated to one of the RAID extents contained in RAID extent sub-group N.

In hard disk drive 7 ("DRIVE7") the first drive extent is shown allocated to one of the RAID extents contained in RAID extent sub-group 1, the second drive extent is shown allocated to one of the RAID extents contained in RAID extent sub-group 2, and another drive extent is shown allocated to one of the RAID extents contained in RAID extent sub-group N.

In hard disk drive 8 ("DRIVE8") the first drive extent is shown allocated to one of the RAID extents contained in RAID extent sub-group 0, the second drive extent is shown allocated to one of the RAID extents contained in RAID extent sub-group 1, the third drive extent is shown allocated to one of the RAID extents contained in RAID extent sub-group 2, and another drive extent is shown allocated to one of the RAID extents contained in RAID extent sub-group N.

In hard disk drive 9 ("DRIVE9") the first drive extent is shown allocated to one of the RAID extents contained in RAID extent sub-group 0, the second drive extent is shown allocated to one of the RAID extents contained in RAID extent sub-group 1, the third drive extent is shown allocated to one of the RAID extents contained in RAID extent sub-group 2, and another drive extent is shown allocated to one of the RAID extents contained in RAID extent sub-group N.

In hard disk drive 10 ("DRIVE10") the first drive extent is shown allocated to of the RAID extents contained in RAID extent sub-group 0, the second drive extent is shown allocated to one of the RAID extents contained in RAID extent sub-group 2, and another drive extent is shown allocated to one of the RAID extents contained in RAID extent sub-group N.

In hard disk drive 11 ("DRIVE11") the first drive extent is shown allocated to one of the RAID extents contained in RAID extent sub-group 0, the second drive extent is shown allocated to one of the RAID extents contained in RAID extent sub-group 1, and a third drive extent is shown allocated to one of the RAID extents contained in RAID extent sub-group 2.

In this way FIG. 4 provides an illustrative example in which a unique corresponding set of drive extents has been allocated to the RAID extents that are contained in each RAID extent sub-group from the Drive Extents 402 that were created in the Group of Hard Disk Drives 400. In the example of FIG. 4, each RAID extent sub-group contains two RAID extents, and each RAID extent indicates five drive extents. Accordingly, each unique corresponding set of drive extents that is allocated to the RAID extents contained in a RAID extent sub-group consists of a total of ten drive extents. As shown in the example of FIG. 4, the corresponding sets of drive extents that are allocated to the RAID extents contained in each RAID extent sub-group are allocated such that for each RAID extent sub-group, no drive extent is allocated to any RAID extent contained in that RAID extent sub-group that is located on the same hard disk drive as any other drive extent allocated to any other RAID extent contained in that RAID extent sub-group.

Figure 5:
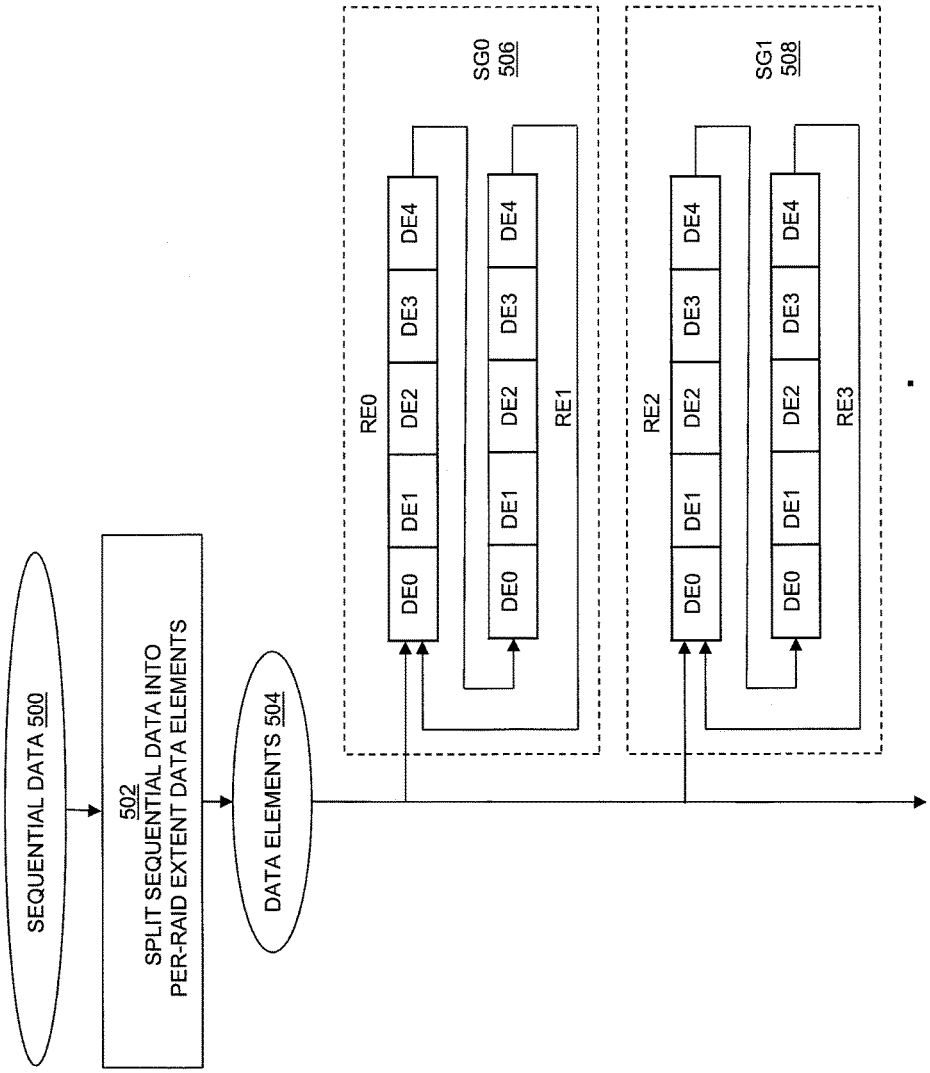
FIG. 5 is a flow chart showing an example of steps performed in some embodiments to divide a set of received data into fixed size data elements and stripe the data elements across the RAID extents contained in one or more identified RAID extent sub-groups.

FIG. 5 is a flow chart showing an example of steps performed in some embodiments to divide a received set of sequential host data into fixed size data elements and stripe the data elements across the RAID extents contained in one or more identified RAID extent sub-groups. The steps of FIG. 5 may, for example, be performed by the RAID Extent Sub-Group Striping Logic 143 of FIG. 1.

As shown in FIG. 5, a set of Sequential Data 500 is received. For example, Sequential Data 500 may be a "dirty" portion of a cache such as the Host I/O Data Cache 175, and may be received during a flush operation performed on the cache. Sequential Data 500 spans a sequential range of logical block addresses within the address space of a storage object, such as a sequential range of logical block addresses within the logical address space of LUN 144. One or more RAID extent sub-groups corresponding to the sequential range of logical block addresses within the logical address space of the storage object is then identified within the RAID mapping table. For example, if the range of logical block addresses within the address space of the storage object begins at the bottom of the address space of the storage object (e.g. beginning at logical block address 0), then one or more RAID extent sub-groups located at the beginning of the RAID mapping table (e.g. RAID extent 0, RAID extent 1, etc.) are identified as corresponding to the sequential range of logical block addresses within the logical address space of the storage object.

At 502, the Sequential Data 500 is divided into multiple fixed size data elements to be striped across individual RAID extents contained in the identified RAID extent sub-group. Each one of the resulting data elements is then stored in the drive extents indicated by a RAID extent that is contained in the identified RAID extent sub-group. For example, each data element may consist of 16 MB (16 megabytes) of the sequential host data. The identified RAID extent sub-group may include or consist of a first RAID extent sub-group in the RAID mapping table, shown as SG0 506 in FIG. 5. In the example of FIG. 5, each RAID extent sub-group contains two RAID extents, and each RAID extent indicates five drive extents, four of which are used to store data, and one of which is used to store parity. Specifically, SG0 contains two RAID extents, RE0 and RE1. Accordingly, the first data element is written to the four drive extents that are used to store data that are indicated the first one of the RAID extents contained in SG0 506, e.g. to the four drive extents indicated by RE0 that are used to store data. 4 MB (4 megabytes) of the first data element are therefore written to each one of the drive extents that are used to store data that are indicated by RE0. Next, the second data element is written to the four drive extents that are used to store data that are indicated the second one of the RAID extents contained in SG0 506, e.g. to the four drive extents indicated by RE1 that are used to store data. 4 MB (4 megabytes) of the second data element are therefore written to each one of the drive extents that are used to store data that are indicated by RE1. Next, the third data element is written to the four drive extents that are used to store data that are indicated the first one of the RAID extents contained in SG0 506, e.g. to the four drive extents indicated by RE0 that are used to store data. 4 MB (4 megabytes) of the third data element are therefore written to each one of the drive extents that are used to store data that are indicated by RE0. The striping of the data elements across the RAID extents contained in SG0 506 continues looping through the RAID extents contained in SG0 506 until either all the data elements have been written, or until the capacity of all the drive extents that are indicated by the RAID extents contained in SG0 506 that are used to store data is completely consumed. If there remain any unwritten data elements after the capacity of all the drive extents that are indicated by the RAID extents contained in SG0 506 that are used to store data is completely consumed, the process may continue similarly looping through the RAID extents contained in the second RAID extent sub-group, shown by SG1 508 in FIG. 5, and so on with subsequent RAID extent sub-groups until all the data elements have been written.

Figure 6:
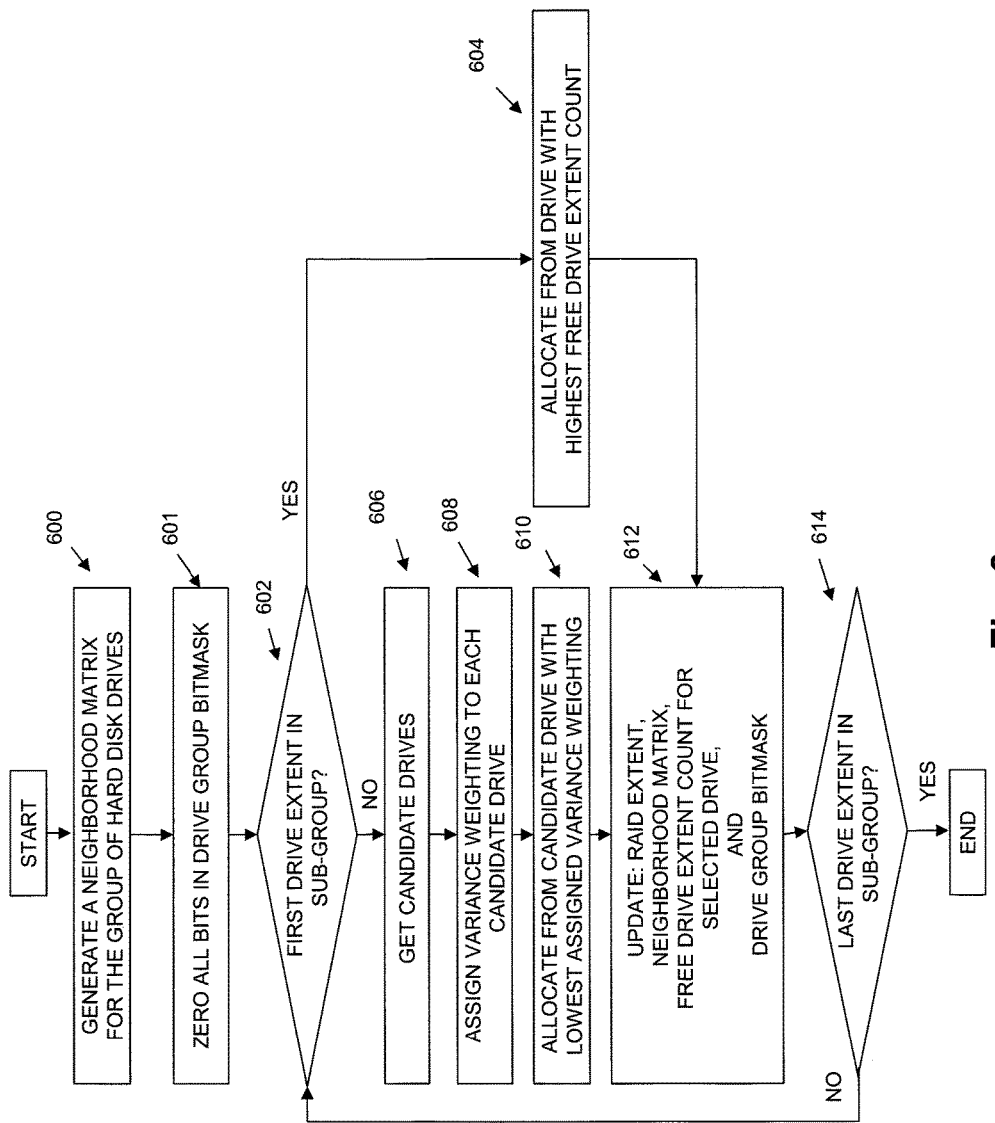
FIG. 6 is a flow chart showing steps performed in some embodiments to allocate a unique corresponding set of drive extents to a RAID extent sub-group.

FIG. 6 is a flow chart showing steps performed in some embodiments to allocate a unique corresponding set of drive extents to the RAID extents contained in a RAID extent sub-group. The steps of FIG. 6 may, for example, be performed by the RAID Mapping Logic 136 to allocate drive extents to each one of the RAID extent sub-groups created by the RAID Extent Sub-Group Creation Logic 137.

Figure 7:
FIG. 7 is a block diagram showing an example of a neighborhood matrix generated for a group of hard disk drives in some embodiments.

At step 600, a neighborhood matrix is generated for a group of hard disk drives, such as the Group of Hard Disk Drives 130 shown in FIG. 1. An example of the format of a neighborhood matrix as may be generated at step 600 is shown in FIG. 7 and described below.

At step 601, the bits in a drive group bitmask are zeroed. The drive group bitmask contains a bit for each one of the hard disk drives in the group of hard disk drives. The drive group bitmask may be used to keep track of which hard disk drives in the group of hard disk drives have previously been used to allocate a drive extent to a RAID extent contained in the RAID extent sub-group. A zero value in a bit in the drive group bitmask indicates that the corresponding hard disk drive has not previously been used to allocate a drive extent to a RAID extent contained in the RAID extent sub-group. A value of one in a bit in the drive group bitmask indicates that the corresponding hard disk drive has been used to allocate a drive extent to a RAID extent contained in the RAID extent sub-group.

At step 602, a determination is made as to whether any drive extents have been allocated to any RAID extent contained in the RAID extent sub-group. If no drive extent has been allocated to any RAID extent contained in the RAID extent sub-group, then the drive extent to be allocated is the first drive extent to be allocated to any RAID extent contained in the RAID extent sub-group, and step 602 is followed by step 604. Otherwise, step 602 is followed by step 606.

At step 604, the number of free drive extents is determined for each hard disk drive in the group of hard disk drives. The hard disk drive is selected that has the highest number of free drive extents, and a drive extent is allocated from the selected hard disk drive. Step 604 is followed by step 612.

At step 606, a list of candidate drives is generated. Each candidate drive in the list of candidate drives has at least one free drive extent, and has a corresponding bit in the drive group bit mask with a value of zero, indicating that no drive extent located on the candidate drive was previously allocated to any RAID extent in the RAID extent sub-group.

At step 608, a variance weighting is assigned to each candidate drive in the list of candidate drives. The variance weighting for a given one of the candidate drives is calculated as the variance of the values in the elements of the neighborhood matrix for the group of hard disk drives, as modified to reflect an allocation of a drive extent from that candidate drive to a RAID extent in the RAID extent sub-group. For example, in an operational example in which hard disk drives 0 and 1 each have located thereon at least one free drive extent, and no drive extent has previously been allocated to a RAID extent in the RAID extent sub-group from hard disk drive 0 or hard disk drive 1, the candidate list would include hard disk drives 0 and 1. The variance weighting for hard disk drive 0 would be equal to the variance of the values in the neighborhood matrix for the group of hard disk drives, albeit modified to reflect allocation of a drive extent from hard disk drive 0 to one of the RAID extents contained in the RAID extent sub-group. Similarly, the variance weighting for hard disk drive 1 would be equal to the variance of the values of the elements in the neighborhood matrix for the group of hard disk drives, albeit alternatively modified to reflect allocation of a drive extent from hard disk drive 1 to a RAID extent contained in the RAID extent sub-group.

The variance of the elements in the neighborhood matrix may be calculated using conventional techniques for calculating a variance. For example, for a neighborhood matrix for a group of hard disk drives that contains N+1 hard disk drives, variance across the values of the neighborhood matrix may be calculated as follows:

$$\overline{NM} = \left(\sum_{\substack{i=0 \\ j=0}}^{N} NM(i, j)\right) / N^2$$

$$\text{variance} = \left(\sum_{\substack{i=0 \\ j=0}}^{N} (NM(i, j) - \overline{NM})^2\right) / N^2$$

At step 610 a drive extent is allocated from the hard disk drive in the candidate list having the lowest variance weighting.

At step 612, an indication of the allocated drive extent is added to a RAID extent contained in the RAID extent sub-group. Further at step 612, the neighborhood matrix for the group of hard disk drives is modified to reflect the allocation of the drive extent to the RAID extent in the RAID extent sub-group. Also at step 612, the count of free drive extents for the hard disk drive from which the drive extent was allocated is decremented, and the bit corresponding to the hard disk drive from which the drive extent was allocated is set within the drive group bitmask. Step 612 is followed by step 614, in which a determination is made as to whether the allocated drive extent is the last drive extent that needs to be allocated to the RAID extents contained in the RAID extent sub-group. If not, then the allocation process continues at step 602. Otherwise, no further drive extents need to be allocated for the RAID extents contained in the RAID extent sub-group, and the drive extent allocation process for the RAID extents contained in the RAID extent sub-group is complete.

By allocating a drive extent from the hard disk drive in the candidate list that has the lowest variance weighting, embodiments of the disclosed technology may advantageously maintain a relatively "flat" set of values in the elements of the neighborhood matrix, in order to provide a high level of disk drive rebuild performance by ensuring that RAID extents are evenly distributed across the hard disk drives in the group of hard disk drives, so that large numbers of hard disk drives are able to concurrently participate in the drive rebuilding process in the event of a drive failure in the group of hard disk drives. See also FIG. 9.

FIG. 7 is a block diagram showing an example of a Neighborhood Matrix 600 ("NM") generated by RAID Mapping Logic 136 and stored in Memory 126 in some embodiments. Each matrix element NM(i,j) in Neighborhood Matrix 600 corresponds to a pair of hard disk drives in a group of hard disk drives (e.g. Group of Hard Disk Drives 130 shown in FIG. 1), where i indicates a first one of the hard disk drives in the pair, and j indicates a second one of the hard disk drives in the pair. The group of hard disk drives in the example of FIG. 7 contains four hard disk drives, numbered 0 through 3, though any specific size of group and numbering may be used in the alternative. Each matrix element in Neighborhood Matrix 600 stores a value equal to a total number of individual RAID extents in a corresponding RAID mapping table (e.g. RAID Mapping Table 138) that each indicate both i) at least one drive extent located on a first one of the hard disk drives in the corresponding pair of hard disk drives (e.g. hard disk drive "i"), and ii) at least one drive extent located on a second one of the hard disk drives in the corresponding pair of hard disk drives (e.g. hard disk drive "j").

For example, the value of each matrix element NM(i,j) in Neighborhood Matrix 600 is equal to the total number of RAID extents in RAID Mapping Table 138 that indicate both at least one drive extent located on a hard disk drive i contained within the Group of Hard Disk Drives 130 and at least one drive extent located on a hard disk drive j contained within the Group of Hard Disk Drives 130, where i and j vary between 0 and 3, since the hard disk drives in the group of hard disk drives in the example of FIG. 7 are hard disk drives numbered 0 through 3. In this way, each element in NM(i,j) indicates how many times hard disk drive i is a "neighbor" to hard disk drive j within a RAID extent. It should be recognized that the Neighborhood Matrix 600 is a symmetric matrix, in that the value of NM(i,j) is equal to the value of NM(j,i), and that the diagonal elements in which i equals j may have a value of 0, since a physical data storage drive cannot be a neighbor to itself, and may be set to zero. The values of NM(0,0), NM(1,1), NM(2,2), and NM(3,3) may accordingly be zero.

Further in the example of FIG. 7, the value of NM(1,0) (and the value of NM(0,1)) is equal to the total number of RAID extents in the RAID mapping table that indicate both at least one drive extent located on hard disk drive 1 and at least one drive extent located on hard disk drive 0. The value of NM(2,0) (and the value of NM(0,2)) is equal to the total number of RAID extents in the RAID mapping table that indicate both at least one drive extent located on hard disk drive 2 and at least one drive extent located on hard disk drive 0. The value of NM(3,0) (and the value of NM(0,3)) is equal to the total number of RAID extents in the RAID mapping table that indicate both at least one drive extent located on hard disk drive 3 and at least one drive extent located on hard disk drive 0. The value of NM(2,1) (and the value of NM(1,2)) is equal to the total number of RAID extents in the RAID mapping table that indicate both at least one drive extent located on hard disk drive 2 and at least one drive extent located on hard disk drive 1. The value of NM(3,1) (and the value of NM(1,3)) is equal to the total number of RAID extents in the RAID mapping table that indicate both at least one drive extent located on hard disk drive 3 and at least one drive extent located on hard disk drive 1. The value of NM(3,2) (and the value of NM(2,3)) is equal to the total number of RAID extents in the RAID mapping table that indicate both at least one drive extent located on hard disk drive 3 and at least one drive extent located on hard disk drive 2.

Figure 8:
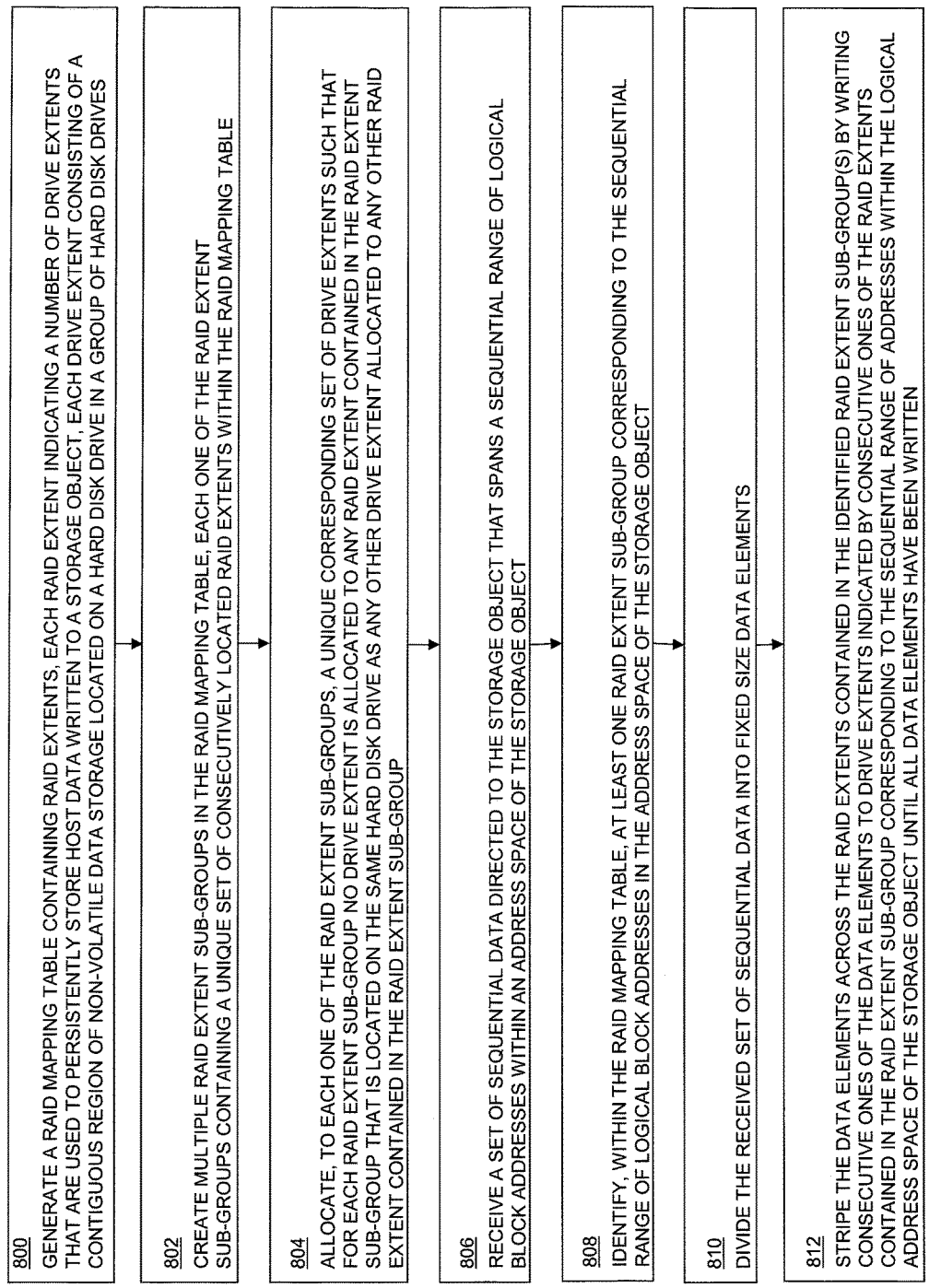
FIG. 8 is a flow chart showing an example of steps performed in some embodiments to allocate drive extents from a group of hard disk drives to specific RAID extent sub-groups, to divide a set of received data into fixed size data elements, and to stripe the data elements across the RAID extents contained in one or more identified RAID extent sub-groups.

FIG. 8 is a flow chart showing an example of steps performed in some embodiments to provide RAID data protection for a storage object in a data storage system that includes a storage processor and a group of hard disk drives communicably coupled to the storage processor. The steps of FIG. 8 may, for example, be performed by the Host I/O Processing Logic 135 shown in FIG. 1.

At step 800, a RAID mapping table is generated that contains RAID extents. Each RAID extent in the RAID mapping table indicates a number of drive extents that are used to persistently store host data written to the storage object by one or more hosts. Each drive extent consists of a contiguous region of non-volatile data storage located on a hard disk drive in the group of hard disk drives.

At step 802, multiple RAID extent sub-groups are created in the RAID mapping table. Each one of the RAID extent sub-groups contains a unique set of consecutively located RAID extents within the RAID mapping table.

At step 804, a unique corresponding set of drive extents is allocated to the RAID extents contained in each one of the RAID extent sub-groups, such that for each RAID extent sub-group no drive extent is allocated to any RAID extent contained in the RAID extent sub-group that is located on the same hard disk drive as any other drive extent allocated to any other RAID extent contained in the RAID extent sub-group.

At step 806, a set of sequential data is received that is directed to the storage object, and that spans a sequential range of logical block addresses within an address space of the storage object.

At step 808, at least one RAID extent sub-group is identified, within the RAID mapping table, that corresponds to the sequential range of logical block addresses in the logical address space of the storage object.

At step 810, the received set of sequential data is divided into fixed size data elements.

At step 812, the data elements are striped across the RAID extents contained in the identified RAID extent sub-group(s) by writing consecutive ones of the data elements to drive extents indicated by consecutive ones of the RAID extents contained in the RAID extent sub-group corresponding to the sequential range of addresses in the logical address space of the storage object until all data elements have been written.

Figure 9:
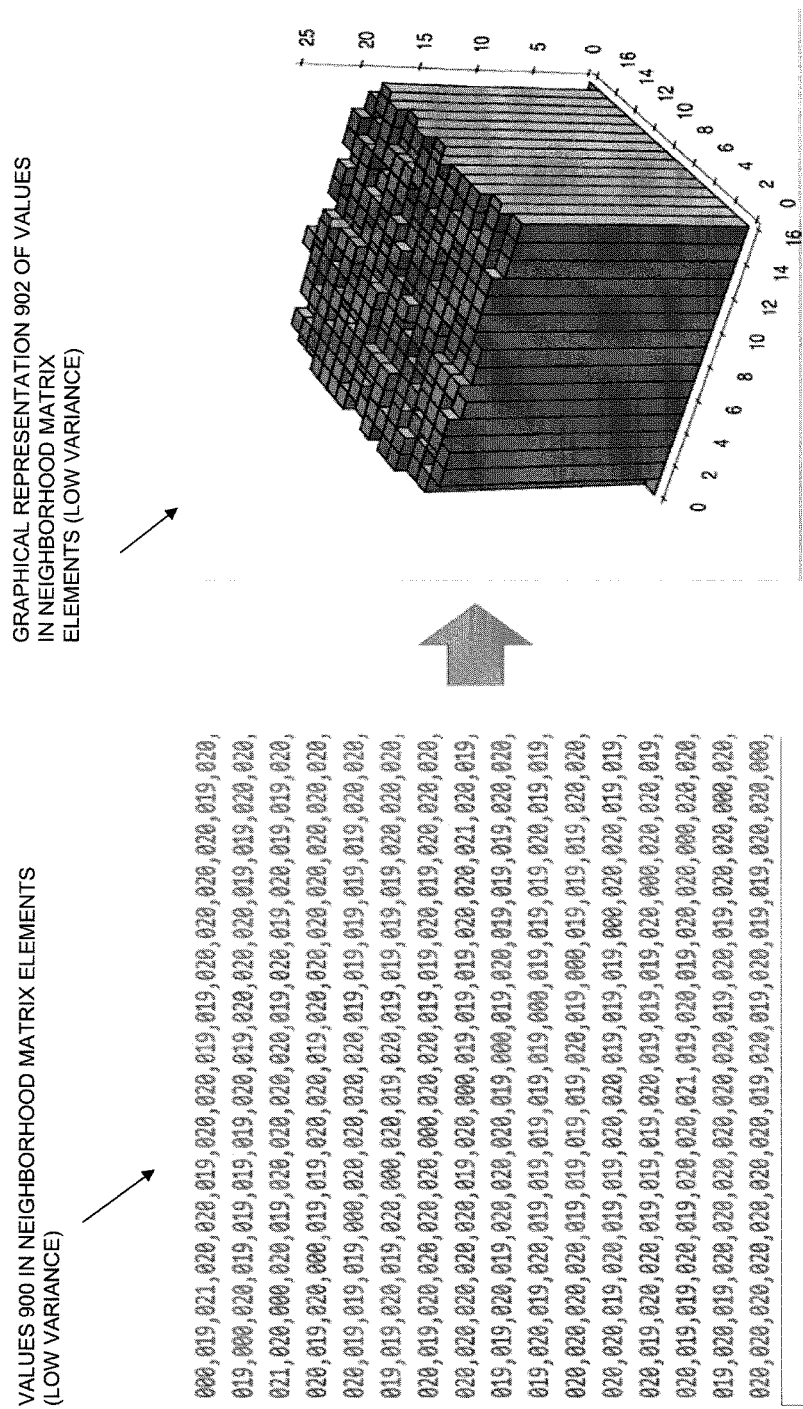
FIG. 9 shows an example of values in a neighborhood matrix for a group of hard disk drives, in which the values of the neighborhood matrix advantageously have a low variance, and a graphical representation of the those values, as may be generated and maintained using some embodiments of the disclosed techniques.

FIG. 9 shows an example of Values 900 in a neighborhood matrix for a group of hard disk drives, in which the values of the neighborhood matrix have a low variance, and a Graphical Representation 902 of the those values. A neighborhood matrix with values having a low variance may advantageously be provided using some embodiments of the disclosed techniques.

In the example of FIG. 9, the group of hard disk drives corresponding to the Values 900 and the Graphical Representation 902 has, for purposes of illustration and explanation, 16 physical data storage drives. The Graphical Representation 902 visually shows that when the values in the elements of a neighborhood matrix have a low variance, then the values of the corresponding graphical representation are significantly "flat". In some embodiments, while allocating drive extents to the RAID extents in a RAID mapping table, some embodiments of the disclosed techniques may allocate at least one drive extent such that a resulting variance in the values of the elements in a neighborhood matrix for the group of hard disk drives is kept low, as described herein. As a result, some embodiments of the disclosed technology may provide a high level of disk drive rebuild performance by ensuring that RAID extents are evenly distributed across the hard disk drives in the group of hard disk drives, so that large numbers of hard disk drives are able to concurrently participate in the drive rebuilding process in the event of a drive failure in the group of hard disk drives.

Figure 10:
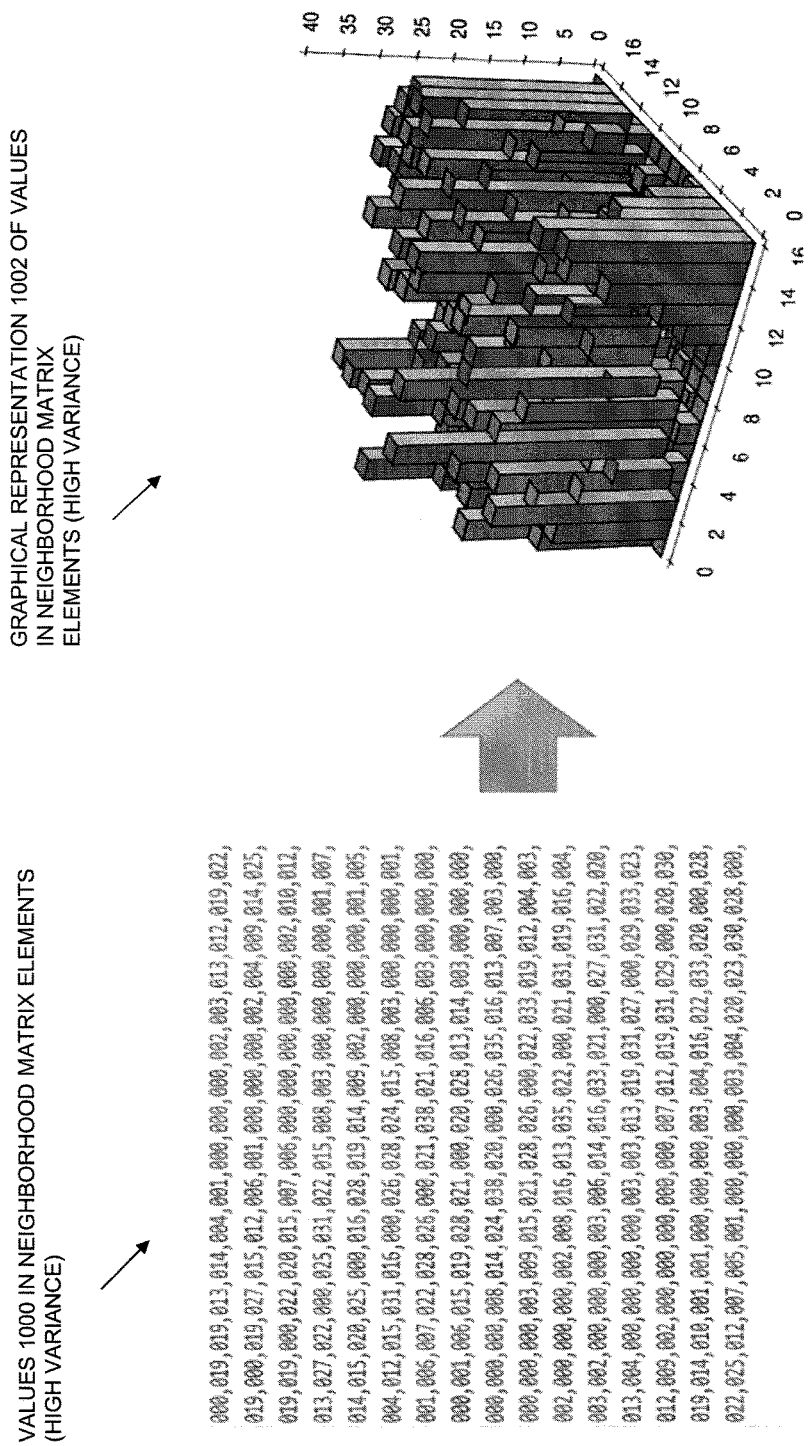
FIG. 10 shows an example of values in a neighborhood matrix for a group of hard disk drives, contrasting with the values shown in FIG. 10, in which the values of the neighborhood matrix have a high variance, and a graphical representation of those values.

In contrast to FIG. 9, FIG. 10 shows an example of Values 1000 in elements of a neighborhood matrix having a high variance, and a Graphical Representation 1002 of the Values 1000. The group of hard disk drives corresponding to the Values 1000 and the Graphical Representation 1002 also has, for example, 16 hard disk drives. The Graphical Representation 1002 illustrates that when the values in the elements of a neighborhood matrix are allowed to have a high variance, then the corresponding graphical representation is not visually "flat". Without using the techniques disclosed for some embodiments herein while allocating drive extents to RAID extents in a RAID mapping table, drive extents may be allocated such that a resulting variance in the values of the elements in the neighborhood matrix for the underlying group of hard disk drives is high, as illustrated in the example of FIG. 10. A low level of disk drive rebuild performance may accordingly result, because smaller numbers of storage drives are able to participate in the drive rebuilding process in the event of a drive failure in the group of hard disk drives.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and a group of hard disk drives communicably coupled to the storage processor, the method comprising:

generating a RAID mapping table, wherein the RAID mapping table contains a plurality of RAID extents, wherein each RAID extent contained in the RAID mapping table indicates a predetermined number of drive extents that are used to persistently store host data written to the storage object by one or more hosts, and wherein each drive extent comprises a contiguous region of non-volatile data storage located on one of the hard disk drives in the group of hard disk drives;

creating, in the RAID mapping table, a plurality of RAID extent sub-groups, wherein each one of the RAID extent sub-groups contains a unique set of consecutively located RAID extents within the RAID mapping table;

allocating, to the RAID extents contained in each one of the created RAID extent sub-groups, a unique corresponding set of drive extents such that for each RAID extent sub-group no drive extent is allocated to any RAID extent contained in the RAID extent sub-group that is located on the same hard disk drive as any other drive extent allocated to any other RAID extent contained in the RAID extent sub-group;

receiving a set of sequential data directed to the storage object that spans a sequential range of logical block addresses within a logical address space of the storage object;

dividing the set of data into multiple fixed size data elements;

identifying, within the RAID mapping table, at least one RAID extent sub-group corresponding to the sequential range of logical block addresses within the logical address space of the storage object; and striping the data elements across the RAID extents contained in the identified RAID extent sub-group by writing consecutive ones of the data elements to sets of drive extents indicated by consecutive ones of the RAID extents contained in the RAID extent sub-group corresponding to the sequential range of logical block addresses of the storage object until all of the data elements have been written.

2. The method of claim 1, wherein each one of the RAID extents in the RAID mapping table indicates the same predetermined total number of drive extents, and further comprising:

calculating a RAID extent sub-group size, wherein the value of the RAID extent sub-group size is at least as large as a result of dividing i) a total number of hard disk drives contained in the group of hard disk drives, by ii) the predetermined total number of drive extents indicated by each one of the RAID extents in the RAID mapping table; and wherein creating the plurality of RAID extent sub-groups further comprises creating each one of the RAID extent sub-groups to contain a total number of consecutively located RAID extents that is equal to the RAID extent sub-group size.

3. The method of claim 2, wherein allocating drive extents to the RAID extent sub-groups includes allocating consecutive, contiguous drive extents from each hard disk drive, starting from drive extents that extend over lower ranges of logical block addresses of the hard disk drive, and continuing upwards through consecutive, contiguously located drive extents that extend over higher ranges of logical block addresses of the hard disk drive.

4. The method of claim 3, further comprising:

generating a neighborhood matrix for the group of hard disk drives, wherein each element in the neighborhood matrix for the group of hard disk drives corresponds to a pair of hard disk drives contained in the group of hard disk drives and stores a value equal to a total number of RAID extents in the RAID mapping table that indicate both i) at least one drive extent located on a first one of the hard disk drives in the pair of hard disk drives corresponding to the element, and ii) at least one drive extent located on a second one of the hard disk drives in the pair of hard disk drives corresponding to the element; and wherein allocating each one of the drive extents in the unique set of drive extents corresponding to the RAID extents contained in each one of the RAID extent sub-groups includes:

i) generating a list of candidate drives contained in the group of hard disk drives, wherein each candidate drive in the list of candidate drives has located thereon at least one free drive extent and has no drive extent located thereon that was previously allocated to any RAID extent in the RAID extent sub-group, ii) assigning, to each one of the candidate drives, a variance weighting that is equal to a variance of the values of the elements in the neighborhood matrix for the group of hard disk drives resulting from modifying the neighborhood matrix to indicate that the drive extent was allocated from the candidate drive, iii) selecting one of the candidate drives having a lowest assigned variance weighting, and iv) allocating a drive extent from the candidate drive having the lowest assigned variance weighting.

5. The method of claim 4, wherein allocating a unique corresponding set of drive extents to each one of the RAID extent sub-groups further includes:

determining whether any drive extent has previously been allocated to the RAID extent sub-group; and in response to determining that no drive extent has previously been allocated to the RAID extent sub-group:
 i) determining which one of the hard disk drives in the group of hard disk drives that has located thereon a number of free drive extents that is greater than the number of free drive extents located on any other hard disk drive in the group of hard disk drives, and
 ii) allocating a drive extent to the RAID extent sub-group from the one of the hard disk drives that has located thereon the number of free drive extents that is greater than the number of free drive extents located on any other hard disk drive in the group of hard disk drives.

6. The method of claim 1, further comprising:

performing a flush operation on a cache located within the data storage system that stores host data received by the data storage system that is directed to the storage object; and wherein the set of sequential data directed to the storage object that spans a sequential range of logical block addresses within a logical address space of the storage object is received from the cache during the flush operation.

7. A data storage system that provides RAID (Redundant Array of Independent Disks) data protection for a storage object, comprising:

at least one storage processor including processing circuitry and a memory;

a group of hard disk drives communicably coupled to the storage processor; and wherein the memory has program code stored thereon, wherein the program code, when executed by the processing circuitry, causes the processing circuitry to:
 generate a RAID mapping table, wherein the RAID mapping table contains a plurality of RAID extents, wherein each RAID extent contained in the RAID mapping table indicates a predetermined number of drive extents that are used to persistently store host data written to the storage object by one or more hosts, and wherein each drive extent comprises a contiguous region of non-volatile data storage located on one of the hard disk drives in the group of hard disk drives,
 create, in the RAID mapping table, a plurality of RAID extent sub-groups, wherein each one of the RAID extent sub-groups contains a unique set of consecutively located RAID extents within the RAID mapping table,
 allocate, to the RAID extents contained in each one of the created RAID extent sub-groups, a unique corresponding set of drive extents such that for each RAID extent sub-group no drive extent is allocated to any RAID extent contained in the RAID extent sub-group that is located on the same hard disk drive as any other drive extent allocated to any other RAID extent contained in the RAID extent sub-group,
 receive a set of sequential data directed to the storage object that spans a sequential range of logical block addresses within a logical address space of the storage object,
 divide the set of sequential data into multiple fixed size data elements,
 identify, within the RAID mapping table, at least one RAID extent sub-group corresponding to the sequential range of logical block addresses within the logical address space of the storage object, and
 stripe the data elements across the RAID extents contained in the identified RAID extent sub-group by writing consecutive ones of the data elements to sets of drive extents indicated by consecutive ones of the RAID extents contained in the RAID extent sub-group corresponding to the sequential range of logical block addresses of the storage object until all of the data elements have been written.

8. The data storage system of claim 7, wherein each one of the RAID extents in the RAID mapping table indicates the same predetermined total number of drive extents, and wherein the program code, when executed by the processing circuitry, further causes the processing circuitry to:

calculate a RAID extent sub-group size, wherein the value of the RAID extent sub-group size is at least as large as a result of dividing i) a total number of hard disk drives contained in the group of hard disk drives, by ii) the predetermined total number of drive extents indicated by each one of the RAID extents in the RAID mapping table; and create the plurality of RAID extent sub-groups at least in part by creating each one of the RAID extent sub-groups to contain a total number of consecutively located RAID extents that is equal to the RAID extent sub-group size.

9. The data storage system of claim 8, wherein the program code, when executed by the processing circuitry, further causes the processing circuitry to allocate drive extents to the RAID extent sub-groups at least in part by allocating consecutive, contiguous drive extents from each hard disk drive, starting from drive extents that extend over lower ranges of logical block addresses of the hard disk drive, and continuing upwards through consecutive, contiguously located drive extents that extend over higher ranges of logical block addresses of the hard disk drive.

10. The data storage system of claim 9, wherein the program code, when executed, further causes the processing circuitry to:

generate a neighborhood matrix for the group of hard disk drives, wherein each element in the neighborhood matrix for the group of hard disk drives corresponds to a pair of hard disk drives contained in the group of hard disk drives and stores a value equal to a total number of RAID extents in the RAID mapping table that indicate both i) at least one drive extent located on a first one of the hard disk drives in the pair of hard disk drives corresponding to the element, and ii) at least one drive extent located on a second one of the hard disk drives in the pair of hard disk drives corresponding to the element; and wherein the program code, when executed, in order to cause the processing circuitry to allocate each one of the drive extents in the unique set of drive extents corresponding to the RAID extents contained in each one of the RAID extent sub-groups, further causes the processing circuitry to:

generate a list of candidate drives contained in the group of hard disk drives, wherein each candidate drive in the list of candidate drives has located thereon at least one free drive extent and has no drive extent located thereon that was previously allocated to any RAID extent in the RAID extent sub-group, assign, to each one of the candidate drives, a variance weighting that is equal to a variance of the values of the elements in the neighborhood matrix for the group of hard disk drives resulting from modifying the neighborhood matrix to indicate that the drive extent was allocated from the candidate drive, select one of the candidate drives having a lowest assigned variance weighting, and allocate a drive extent from the candidate drive having the lowest assigned variance weighting.

11. The data storage system of claim 10, wherein the program code, when executed, in order to cause the processing circuitry to allocate a unique corresponding set of drive extents to each one of the RAID extent sub-groups, further causes the processing circuitry to:

determine whether any drive extent has previously been allocated to the RAID extent sub-group; and in response to a determination that no drive extent has previously been allocated to the RAID extent sub-group:

i) determine which one of the hard disk drives in the group of hard disk drives that has located thereon a number of free drive extents that is greater than the number of free drive extents located on any other hard disk drive in the group of hard disk drives, and ii) allocate a drive extent to the RAID extent sub-group from the one of the hard disk drives that has located thereon the number of free drive extents that is greater than the number of free drive extents located on any other hard disk drive in the group of hard disk drives.

12. The data storage system of claim 7, further comprising:

a cache located within the data storage system that stores host data received by the data storage system that is directed to the storage object; and wherein the set of sequential host directed to the storage object that spans the sequential range of logical block addresses of the storage object is received from the cache during a flush operation.

13. A non-transitory computer readable medium for providing RAID (Redundant Array of Independent Disks) data protection for a storage object, comprising instructions stored thereon, that when executed on processing circuitry in a storage processor, perform the steps of:

generating a RAID mapping table, wherein the RAID mapping table contains a plurality of RAID extents, wherein each RAID extent contained in the RAID mapping table indicates a predetermined number of drive extents that are used to persistently store host data written to a storage object by one or more hosts, and wherein each drive extent comprises a contiguous region of non-volatile data storage located a hard disk in a group of hard disk drives;

creating, in the RAID mapping table, a plurality of RAID extent sub-groups, wherein each one of the RAID extent sub-groups contains a unique set of consecutively located RAID extents within the RAID mapping table;

allocating, to the RAID extents contained in each one of the created RAID extent sub-groups, a unique corresponding set of drive extents such that for each RAID extent sub-group no drive extent is allocated to any RAID extent contained in the RAID extent sub-group that is located on the same hard disk drive as any other drive extent allocated to any other RAID extent contained in the RAID extent sub-group;

receiving a set of sequential data directed to the storage object that spans a sequential range of logical block addresses within a logical address space of the storage object;

dividing the set of data into multiple fixed size data elements;

identifying, within the RAID mapping table, at least one RAID extent sub-group corresponding to the sequential range of logical block addresses within the logical address space of the storage object; and striping the data elements across the RAID extents contained in the identified RAID extent sub-group by writing consecutive ones of the data elements to sets of drive extents indicated by consecutive ones of the RAID extents contained in the RAID extent sub-group corresponding to the sequential range of logical block addresses of the storage object until all of the data elements have been written.

* * * * *